US012677032B2

(12) United States Patent
Barbis et al.

(10) Patent No.: US 12,677,032 B2
(45) Date of Patent: Jul. 7, 2026

(54) METHOD AND SYSTEM FOR INTERNAL FAILOVER OF INTERMEDIARY GATEWAY

(71) Applicant: The Nielsen Company (US), LLC, New York, NY (US)

(72) Inventors: Andrej Barbis, Ilirska Bistrica (SI); Peter Šik, Izola (SI); Kristjan Bogdan, Divaca (SI); Bostjan Stumpfel, Divaca (SI); Saso Vranek, Koper (SI)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/823,974

(22) Filed: Sep. 4, 2024

(65) Prior Publication Data

US 2025/0097526 A1     Mar. 20, 2025

Related U.S. Application Data

(60) Provisional application No. 63/583,985, filed on Sep. 20, 2023.

(51) Int. Cl.
*H04N 21/442* (2011.01)

(52) U.S. Cl.
CPC .............................. *H04N 21/44204* (2013.01)

(58) Field of Classification Search
CPC ....... H04N 21/44204; H04N 21/44218; H04N 21/2407; H04N 21/44227; H04N 21/4424; H04N 21/41; H04N 21/44222; H04N 21/2404; H04N 21/442; H04N 21/6375; H04N 21/2402; H04N 21/4425; H04N 21/6473; G06F 11/2028; G06F 11/2046; G06F 11/2097; G06F 11/2023

USPC ............................................................ 725/14
See application file for complete search history.

(56) References Cited

U.S. PATENT DOCUMENTS

| | | | | | |
|---|---|---|---|---|---|
| 5,825,769 | A | * | 10/1998 | O'Reilly ................. | H04L 69/16 379/112.09 |
| 6,421,741 | B1 | * | 7/2002 | Minyard ............. | H04L 67/1095 714/E11.073 |
| 10,862,994 | B1 | * | 12/2020 | Ganjam .................. | H04L 67/60 |
| 2004/0090913 | A1 | * | 5/2004 | Scudder .................. | H04L 45/02 370/219 |
| 2015/0365714 | A1 | * | 12/2015 | Gildfind ................. | H04H 60/33 725/12 |
| 2018/0176113 | A1 | * | 6/2018 | Thota .................. | H04N 21/2407 |
| 2019/0205745 | A1 | * | 7/2019 | Sridharan .............. | G06N 3/088 |

(Continued)

*Primary Examiner* — Cynthia M Fogg
(74) *Attorney, Agent, or Firm* — McDonnell Boehnen Hulbert & Berghoff LLP

(57) ABSTRACT

An intermediary gateway, such as a streaming meter, with internal failover operation. In an example, the gateway contains (i) main gateway logic, including as a main network interface and main processor with associated data storage holding instructions executable by the main processor to govern operation of the gateway, and (ii) backup gateway logic, including as a backup network interface and backup processor with associated data storage also holding instructions executable by the main processor to govern operation of the gateway. Further, the main program instructions are executable by the main processor to detect a failure of the main processor to communicate on the network and to responsively cause activation of the backup gateway logic as active gateway logic of the gateway, to facilitate continued operation of the gateway.

19 Claims, 3 Drawing Sheets

(56) References Cited

U.S. PATENT DOCUMENTS

| | | | | |
|---|---|---|---|---|
| 2020/0296608 | A1* | 9/2020 | Usaj ..................... | H04W 24/08 |
| 2020/0382230 | A1* | 12/2020 | Sun ...................... | G06V 20/46 |
| 2021/0311849 | A1* | 10/2021 | Barbis ................ | G06F 11/0772 |
| 2025/0080494 | A1* | 3/2025 | Banic ................. | H04L 61/5014 |

* cited by examiner

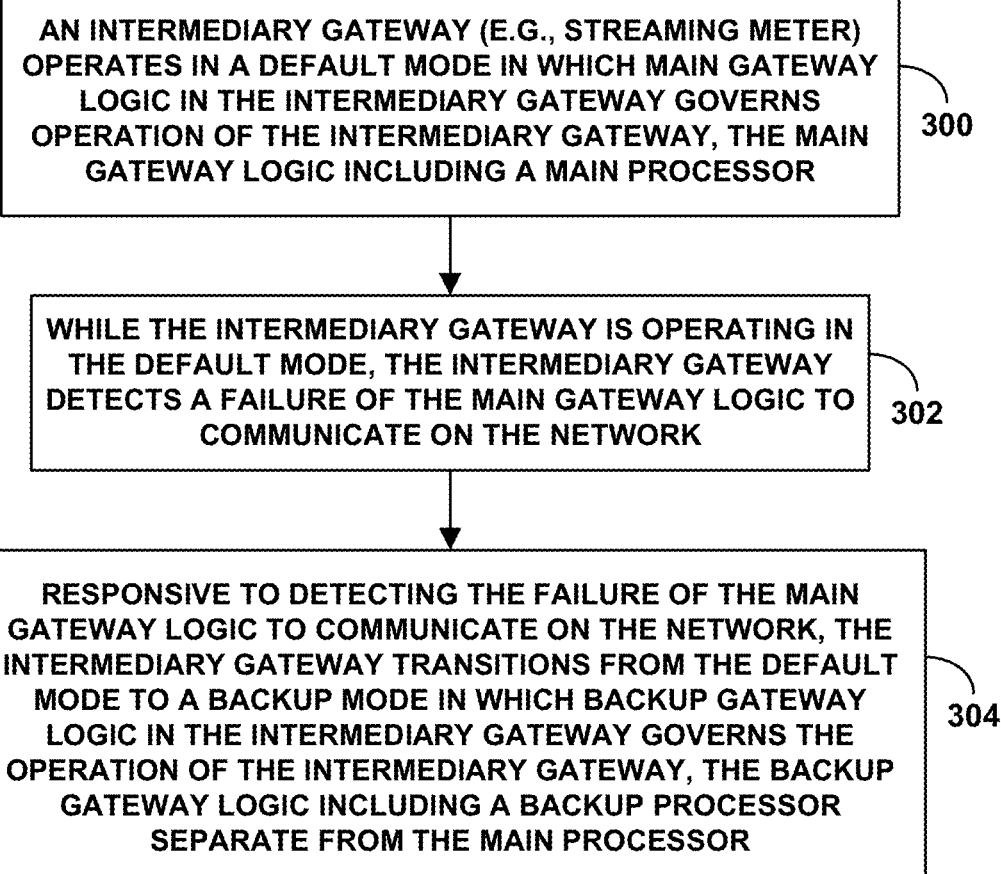

AN INTERMEDIARY GATEWAY (E.G., STREAMING METER) OPERATES IN A DEFAULT MODE IN WHICH MAIN GATEWAY LOGIC IN THE INTERMEDIARY GATEWAY GOVERNS OPERATION OF THE INTERMEDIARY GATEWAY, THE MAIN GATEWAY LOGIC INCLUDING A MAIN PROCESSOR — 300

WHILE THE INTERMEDIARY GATEWAY IS OPERATING IN THE DEFAULT MODE, THE INTERMEDIARY GATEWAY DETECTS A FAILURE OF THE MAIN GATEWAY LOGIC TO COMMUNICATE ON THE NETWORK — 302

RESPONSIVE TO DETECTING THE FAILURE OF THE MAIN GATEWAY LOGIC TO COMMUNICATE ON THE NETWORK, THE INTERMEDIARY GATEWAY TRANSITIONS FROM THE DEFAULT MODE TO A BACKUP MODE IN WHICH BACKUP GATEWAY LOGIC IN THE INTERMEDIARY GATEWAY GOVERNS THE OPERATION OF THE INTERMEDIARY GATEWAY, THE BACKUP GATEWAY LOGIC INCLUDING A BACKUP PROCESSOR SEPARATE FROM THE MAIN PROCESSOR — 304

Fig. 3

METHOD AND SYSTEM FOR INTERNAL FAILOVER OF INTERMEDIARY GATEWAY

REFERENCE TO RELATED APPLICATION

This application claims priority to U.S. Provisional Patent Application No. 63/583,985, filed Sep. 20, 2023, the entirety of which is hereby incorporated by reference.

SUMMARY

In order to measure the extent to which people of various demographics engage with and/or are otherwise exposed to media content (e.g., linear broadcast content, streaming media content, websites, applications, etc.), a media-measurement company can arrange to have monitoring devices or "meters" operate in representative households or other sites. People who have their media exposure monitored may be considered "panelists," and the places where the monitoring occurs, such as home, offices, or other premises, may be considered "panelist sites." Panelists may opt into and thus consent to this monitoring.

Meters can take various forms, including for instance (i) "presentation meters," which may be configured to monitor presentation or playing of media by media-presentation devices such as televisions, computers, tablets, phones, gaming devices, smart speakers, radios, streaming-media players, set top boxes, and audio-visual receivers, and (ii) "streaming meters" (i.e., network-traffic meters), which may be configured to monitor network traffic such as but not limited to streaming-media-related traffic and web browsing traffic.

At each of various panelist sites having a media-presentation device, for example, the media-measurement company may arrange for a presentation meter to monitor media presentation by that device and to generate query signature data representing the presented media. Further, the media-measurement company may operate a back-end, cloud-based computing system, to receive and evaluate this presentation-meter-generated query signature data, in order to identify the media presented at the panelist site and thereby to establish associated media-exposure data.

By evaluating an audio line feed into the media-presentation device and/or by evaluating associated acoustic speaker output, a representative presentation meter at a panelist site may be configured to detect and extract watermarked identification codes from the audio and/or to generate digital audio fingerprint data representing the audio, and to report the identification codes and/or fingerprint data, along with associated timestamps, as query signature data to the computing system for analysis. Such a presentation meter may also be configured to detect the power on or off state of the media-presentation device, so that the presentation meter can limit its media-presentation monitoring to times when the media-presentation device is on and therefore likely presenting media content being delivered to the media-presentation device.

The back-end computing system may then be configured to refer to reference signature data that maps various identification codes and/or fingerprint data to known media content items, in order to determine, based on the presentation-meter-reported identification codes and/or fingerprint data, what media content the media-presentation device was presenting at the indicated time. In particular, the computing system may be configured to search through the reference signature data in an effort to find reference signature data that matches the reported query signature data and, upon finding a match with sufficient certainty, to conclude that media content represented by the query signature data is the media associated with the matching reference signature data, and to establish associated media-presentation records for the panelist site, thus crediting the identified media content as being presented at the panelist site (e.g., as panelist-credited content).

Further, the computing system may be configured to correlate these media-presentation records with pre-stored demographics of the panelist and/or panelist site at issue, in order to establish associated media-exposure data, and the computing system may be configured to use this media-exposure data from multiple panelist sites as a basis to establish ratings statistics that may facilitate commercial processes such as ad placement and other content delivery.

In addition, at each of various panelist sites having a local area network (LAN) or otherwise supporting packet-based network communication, the media-measurement company may arrange for a streaming meter to monitor and report information about network traffic at the panelist site. Without limitation, this network traffic may include streaming-media-related traffic such as streaming-media control communications and ongoing streaming-media sessions. Further, this network traffic may take additional forms as well, such as web-browsing traffic and other interaction with online or other network resources.

Monitoring streaming-media-related traffic in particular may help to facilitate media measurement (e.g., audience measurement) related to media streaming from by Over The Top (OTT) streaming-media service providers. For instance, when query signature data provided by a presentation meter matches reference signature data representing non-linear streaming-media content and the computing system therefore credits that streaming-media content as having been presented at the panelist site, it may also be useful for the computing system to identify the source of that streaming-media content. Including this source information as part of the media-exposure data may enhance the data and associated ratings statistics and may facilitate useful action keyed to the source. For instance, knowledge that panelists (e.g., of particular demographics) have been exposed to content provided by a particular OTT service provider may support a decision to arrange for that OTT service provider to distribute particular ads and/or other content, among other possibilities.

Similarly, monitoring other sorts of network traffic at a panelist site may also help to provide and/or enhance media-exposure measurement. For instance, it may be useful to monitor the extent to which network traffic flows between the panelist site and various web sites, web apps, or other online resources. Knowledge that panelists (e.g., of particular demographics) have visited particular websites and/or have otherwise engaged with particular network resources may similarly support ad-placement decisions or the like.

One way to facilitate monitoring network traffic at a panelist site would be to situate the streaming meter within a network communication path through which traffic of interest would flow, so that the streaming meter would have a view of that traffic. In an example implementation, the traffic of interest may include packet-based internet communications to and/or from each of one or more media-presentation devices (such as any of those noted above) or other host devices at the panelist site. Therefore, it may be useful to situate the streaming meter within a network communication path through which those internet communications would flow at the panelist site.

In a usual arrangement, a LAN would have a router (e.g., a panelist-site router, such as a household router) that is set to function as a gateway between the LAN and the internet. Hosts on the LAN would then be set to use that router as a default gateway for their internet communications. In particular, when hosts have outbound packet traffic to transmit on the internet, the hosts may transmit that traffic on the LAN to an address of the router, and the router would forward the traffic onto the internet (typically applying network address translation (NAT) between a local Internet Protocol (IP) address of the host and a global IP address of the router or associated modem on the internet). Likewise, the router may receive inbound internet traffic destined to the host, and the router may forward that traffic on the LAN to the host.

With this arrangement, the streaming meter could be connected on the LAN and set to use the router as the streaming meter's default gateway, and the streaming meter could also be made to function as a default gateway for the hosts on the LAN so that internet traffic of the hosts would be routed through the streaming meter, so that the streaming meter could monitor that traffic to facilitate media-exposure measurement.

Namely, the hosts could be set to use the streaming meter, rather than the router, as their default gateway, and the streaming meter could be set to function as an intermediary between the hosts and the router. Each host would thus transmit its outbound internet traffic to the streaming meter, and the streaming meter would forward that traffic to the router and the router would in turn forward the traffic onto the internet. Likewise, when the router receives inbound internet traffic destined to a host, the router may forward that traffic to the streaming meter, and the streaming meter may then forward that traffic in turn to the host.

Further, in a LAN that uses Dynamic Host Control Protocol (DHCP) to assign IP addresses to hosts, operating as a default gateway for the hosts could also include operating as a DHCP server for the hosts. And operating as a DHCP server for the hosts could include dynamically assigning IP addresses to the hosts, granting each host an IP address lease for a defined lifetime, and renewing each host's IP address lease in response to DHCP renew signaling from the host before expiration of the lease lifetime. Further, DHCP signaling from the DHCP server may be used as a mechanism to configure each host's default-gateway setting. In particular, a DHCP server could include in its DHCP signaling to each host a directive that specifies a default gateway IP address and thus causes the host to use that IP address as the host's default gateway address through which to route the host's internet communications.

In that arrangement, having the streaming meter rather that the router operate as default gateway for the hosts could then also involve the streaming meter rather than the router operating as a DHCP server for the hosts. Thus, the streaming meter rather than the router could dynamically grant IP leases to the hosts and could renew each host's IP address lease in response to DHCP signaling from the host before expiration of the lease lifetime.

Without limitation, in a LAN that uses DHCP to assign IP addresses to hosts, one approach would be for the streaming meter to engage in a process to prevent the router from assigning IP addresses to the hosts so that the router would be unable to function as a DHCP server for the hosts, and for the streaming meter itself to function as a DHCP server for the hosts, assigning IP addresses to the hosts and also directing and thus causing the hosts to use the streaming meter as their default gateway.

For instance, the streaming meter could engage in DHCP signaling with the router (i) to cause a DHCP server of the router to release currently assigned IP addresses and (ii) to itself acquire from the DHCP server of the router assignment of all IP addresses assignable by the router-so that the router would then be unable to renew IP leases or grant new IP leases and the router would be set to route to the streaming meter inbound internet communications destined to any of those IP addresses. Further, the streaming meter could be configured to itself operate as a DHCP server to respond to DHCP requests from hosts, and DHCP signaling from the DHCP server of the streaming meter to the hosts could function to both assign IP addresses to the hosts and also direct and thus cause the hosts to use the streaming meter as their default gateway.

In addition, having the streaming meter operate as a default gateway for the hosts could also involve having the streaming meter operate as a Domain Name Service (DNS) server for the hosts, so as to enable the streaming meter to monitor DNS queries from the hosts, which could help to enhance media-exposure measurement. In normal practice, for instance, each host may be configured with an IP address of at least one DNS server on the internet, so that, when the host is going to transmit a communication to a given internet domain, the host can query the DNS server at that IP address to map the domain to a destination IP address to which the host should address its communication.

Without limitation, in a LAN that uses DHCP to assign IP addresses to hosts, one approach would be for the streaming meter to configure itself as a DNS intermediary for the hosts. For instance, the streaming meter may include in its DHCP signaling to the hosts a specification of an IP address of the streaming meter as a DHCP server address, in order to cause the hosts to set the IP address of the streaming meter as their DHCP server address. When a host sends a DNS query (as a form of outbound internet communication), that DNS query would thus go to the streaming meter to enable DNS monitoring for media-exposure measurement, and the streaming meter could then forward the DNS query along to an actual DNS server on the internet to facilitate mapping to a destination IP address.

Unfortunately, a technical issue that can arise in practice with the streaming meter being configured as the default gateway for one or more hosts on the LAN is that, if the streaming meter loses its ability to communicate on the LAN, the hosts that are set to use the streaming meter as their default gateway may lose their internet connectivity.

For instance, hosts may attempt to send outbound internet communications by transmitting the communications to an address of the streaming meter, but the streaming meter may not receive those communications and therefore the hosts may receive no responses to their internet communications. Further, when the router receives inbound internet communications destined to IP addresses of the hosts, the router would transmit those communications to the streaming meter since the router has those IP addresses assigned to the streaming meter, but the streaming meter may not receive those communications and therefore the hosts may not receive the communications.

Further, each such host may not overcome this problem for some time. For instance, if a host has acquired an IP address lease from the streaming meter as noted above, the host may not overcome this problem until the host tries and fails to renew that lease from the streaming meter and then resorts to newly acquiring an IP address lease from the router—and also assuming that the router then has at least one IP address available to assign, e.g., due to expiration of an IP address lease that the router had granted to the streaming meter.

The present disclosure provides a technical mechanism to help address this problem. In accordance with the disclosure, a streaming meter could be structured internally with backup gateway logic that would apply if and when the streaming meter loses its ability to communicate on the LAN. In particular, the streaming meter, as a unitary device, could be structured internally with both (i) main gateway logic that the streaming meter would use as a basis to operate as default gateway for one or more hosts on the LAN as discussed above for instance, and (ii) backup gateway logic that the streaming meter would use as a basis to continue operating as default gateway for the one or more hosts in a situation where the streaming meter's main gateway logic loses the ability to communicate on the LAN.

In an example implementation, the main gateway logic and backup gateway logic in the streaming meter could each include a separate respective network interface and a separate respective processor and processing stack. Further, the main gateway logic and backup gateway logic may engage in processing to synchronize various networking data, so that they would each have access to the latest such data to facilitate carrying out streaming-meter operations. For instance, the main processor and backup processor may each have access to shared memory or other shared data storage in which they maintain an updated copy of this data, so that each processor can load a latest copy of the data into its cache memory when the processor becomes active.

With this example arrangement, when the main gateway logic loses the ability to communicate on the LAN, the backup gateway logic can kick in and make use of the same networking data to enable the streaming meter to continue to function as default gateway (including, e.g., as DHCP server) for one or more hosts on the LAN.

Furthermore, as to media monitoring to facilitate media-exposure measurement, the main gateway logic may be configured to engage in that monitoring and reporting to the back-end system. In some implementations, the backup gateway logic may also be configured to engage in that monitoring and reporting when the backup gateway logic is activated in place of the main gateway logic. In other implementations, the backup gateway logic may be configured to monitor traffic and to stage data for later analysis and reporting by the main gateway logic when the main gateway logic gets restored. Alternatively, the backup gateway logic may not do any monitoring of traffic for media-measurement purposes, but may at a minimum help to overcome the internet-connectivity-loss problem noted above.

These as well as other aspects, advantages, and alternatives, will become apparent to those of ordinary skill in the art by reading the following detailed description, with reference where appropriate to the accompanying drawings. Further, it should be understood that the disclosure provided in this summary and elsewhere in this document is provided by way of example only and that numerous variations and other examples may be possible as well.

BRIEF DESCRIPTION OF THE DRAWINGS

FIG. 3 is a flow chart illustrating an example method.

DETAILED DESCRIPTION

The present disclosure will discuss example implementation in relation to a panelist's home where there are one or more media presentation devices such as any of those noted above for instance. In this arrangement, the panelist may be a resident of the home and may be registered as a panelist with a media-measurement company, opting in and thus consenting to media monitoring to facilitate media-exposure measurement for instance. It will be understood, however, that the disclosed principles could apply as well in other contexts, such as at other panelist sites, among other possibilities.

Further, the present disclosure will discuss example implementation with respect to a streaming meter. However, it will be understood that various disclosed principles could apply as well with respect to other types of devices and computing systems. For instance, similar principles could apply as to another type of LAN node (i.e., not a streaming meter) or computing system that is set to function as an communication intermediary for one or more hosts. For instance, similar principles could apply with respect to the main router of a LAN, or with respect to another device or computing system situated in a communication path between a host and the main router, among other possibilities.

Still further, it will be understood that arrangements and processes disclosed herein could take various other forms. For instance, elements and operations could be re-ordered, distributed, replicated, combined, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

Example Network Arrangement

Figure 1:
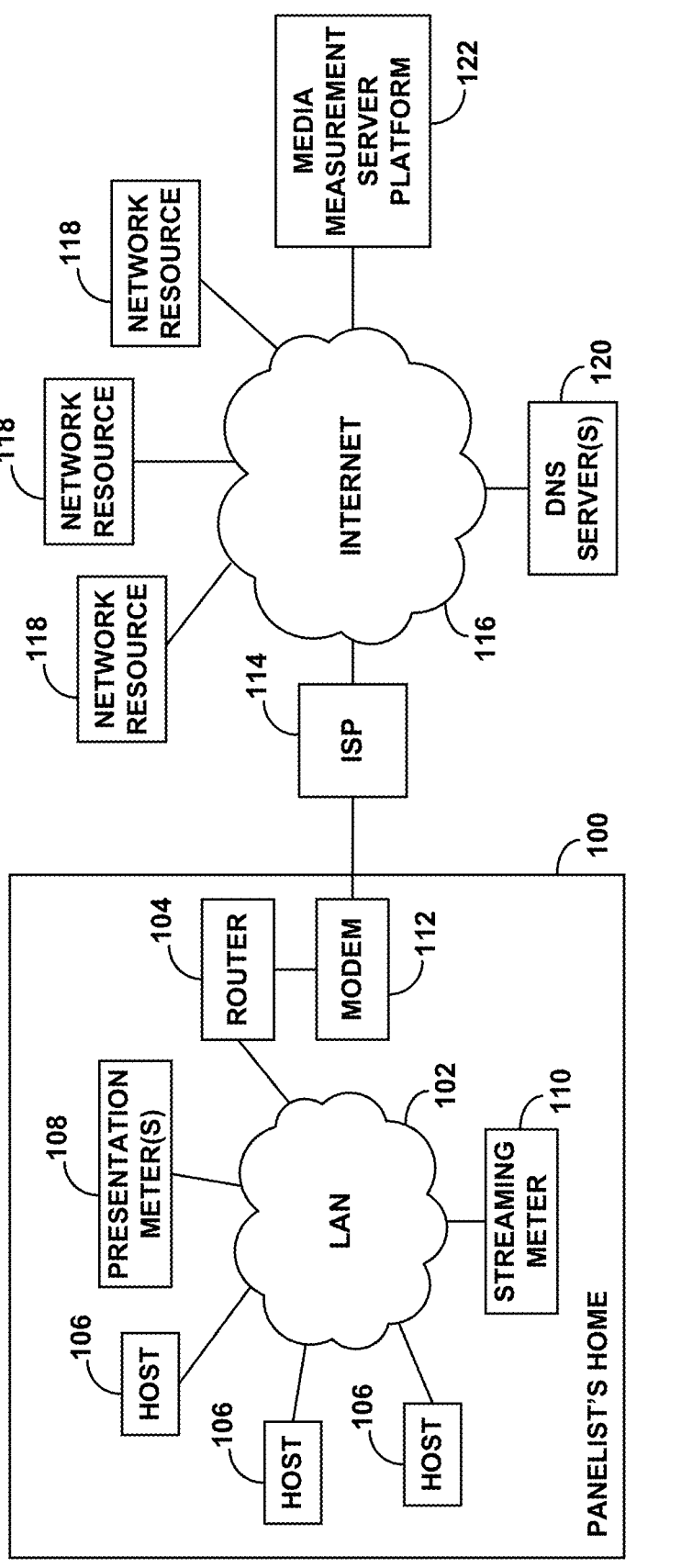
FIG. 1 is a simplified block diagram of an example arrangement in which disclosed features could be implemented.

Referring to the drawings, as noted above, FIG. 1 is a simplified diagram of an example arrangement in which various disclosed features could be implemented. In particular, FIG. 1 depicts at a panelist's home 100 an example packet-switched LAN 102 having a number of LAN nodes including but not limited to a household router 104, one or more hosts of interest (e.g., media presentation devices) 106, one or more presentation meters 108, and an example streaming meter 110. These nodes may be connected to the LAN through wired (e.g., Ethernet) and/or wireless (e.g., Wi-Fi) links. Further, as noted above, the streaming meter 110 could be provided as a separate device or alternatively as logic within another device, possibly integrated with a presentation meter 108 for instance.

As shown, the router 104 is connected with a modem 112, which provides connectivity with an internet service provider (ISP) 114, to facilitate communication on the internet 116. Alternatively, the router 104 may be integrated with the modem 112.

Shown accessible through the internet 116 (e.g., at particular public IP addresses on the internet) are then multiple network resources 118 such as streaming-media servers, web servers, application servers, etc., and one or more Domain Name Service (DNS) servers 120. Further, also shown accessible through the internet 116 is a media-measurement server platform 122, which may be operated by an example media-measurement company.

Each of the nodes on the LAN may have a permanent or semi-permanent hardware address, typically a Media Access Control (MAC) address assigned to a network interface of the node during manufacturing. A MAC address may be a 12-digit hexadecimal number that uniquely identifies a network interface card of the node, typically expressed as sequence of six 2-digit values, such as XX: XX: XX: XX: XX. A node's MAC address may include a prefix keyed to the node's manufacturer and thus possibly indicating a brand of the node, and the node's MAC address might also include one more components corresponding with the node's model or other such information.

Further, each node on the LAN may have a respective IP address that is unique in the context of the LAN. These IP addresses may take various forms and may be assigned or established in various ways depending on the version of IP in use.

To communicate a block of data in the LAN from a first node having a source IP address and source MAC address to a second node having a destination IP address and destination MAC address, the first node could process the data downward through layers of a protocol stack culminating with output on a physical layer defining the physical transmission channel between the first node and the second node, and the second node may then receive the data on the physical layer and process the data upward through a corresponding protocol stack.

After processing the data through application and transport layers, for instance, the first node may generate at a network layer an IP packet that contains the data and has an IP header specifying the source and destination IP addresses, and the first node may pass that IP packet down to a data-link layer, where the first node may then generate an Ethernet frame (or Ethernet packet) by adding to the IP packet an Ethernet header that specifies the source and destination MAC addresses. (If the IP packet is longer than a maximum size for an Ethernet frame, the IP packet may be fragmented and each fragment could be encapsulated in a respective Ethernet frame.) The first node may then output that Ethernet frame on the physical layer where it would be routed per its Ethernet header from the source MAC address of the first node to the destination MAC address of the second node.

A node that has a given MAC address would monitor the Ethernet layer for Ethernet frames specifying that MAC address as their destination address. Thus, the second node in the above scenario would monitor for and receive the Ethernet frame transmitted by the first node. Upon receipt of this Ethernet frame, the second node may then strip the Ethernet header at a data-link layer to uncover the IP packet and then strip the IP header at the network layer, and may then engage in further processing at the transport and application layers to uncover the transmitted data.

To facilitate this packet routing, the LAN nodes may support use of a protocol to translate IP addresses to MAC addresses. This protocol may differ depending on the version of IP in use. With IPv4, for instance, the nodes may use Address Resolution Protocol (ARP) to translate IP addresses to MAC addresses and may further build and maintain an ARP table that maps IP addresses to MAC addresses. Whereas, with IPV6, the nodes may use Neighbor Discovery Protocol (NDP) to translate IP addresses to MAC addresses and may further build and maintain an NDP table that maps IP addresses to MAC addresses.

Example Injection of Streaming Meter as Default Gateway

In line with the discussion above, the streaming meter 110 may be configured to operate on the LAN 102 as a default gateway for the one or more hosts 106, so that internet communications to and from the hosts could flow through the streaming meter 110 and the streaming meter could monitor those communications and report to the media-measurement server platform 122 in order to facilitate media-exposure measurement.

Further, as noted above, the process of the streaming meter operating as a default gateway for the hosts could also include the streaming meter 110 operating as a DHCP server for the hosts, so that the streaming meter would manage IP address assignment to the hosts. Still further, the process of the streaming meter operating as a default gateway for the hosts could also include the streaming meter 110 operating as a DNS server for the hosts, so that DNS queries from the hosts (as a form of internet communications) would flow through the streaming meter 110 and the streaming meter could monitor those queries and to report accordingly to the media-measurement server platform 122 also to facilitate media-exposure measurement.

As noted above, without limitation, the streaming meter 110 could be set as the default gateway of the hosts by forcing the hosts to use the streaming meter 110 as their DHCP server, and with DHCP messaging from the streaming meter 110 directing and thus causing the hosts to set an IP address of the streaming meter 110 as their default gateway address and to set an IP address of the streaming meter 110 as their DNS server address.

The following paragraphs walk through example normal operation of the LAN and example injection of the streaming meter as a default gateway for the hosts. It will be understood that other mechanisms could be applied as well.

In the example arrangement of FIG. 1, the router 104 may have a statically defined IP address on the LAN 102 and may normally operate as a DHCP server to dynamically assign unique IP addresses on the LAN 102 to the other nodes on the LAN. For this purpose, the router 104 may be configured to manage a defined pool of IP addresses and to dynamically assign IP addresses selected from that pool. For instance (using IPv4 by way of example), if the router's IP address is 192.168.1.1, the router 104 may be set to dynamically assign IP addresses in the range 192.168.1.2 through 192.168.1.255, among other possibilities.

The router 104 may maintain a DHCP table that specifies each assigned IP address and maps each assigned IP address to the MAC address of the node to which the IP address is assigned. Further, the router 104 may also maintain an ARP table as noted above and may update the ARP table each time the router 104 makes a change to its DHCP table or otherwise learns of a new IP-MAC correlation.

The DHCP address assignment process is known as "DORA," as it includes the following sequence of DHCP messages: (i) Discover, (ii) Offer, (iii) Request, and (iv) Acknowledge. When a node gets enabled on the LAN (e.g., connected and powered on), the node may broadcast a DHCP DISCOVER message specifying the node's MAC address as source MAC address and a generic IP address (e.g., 0.0.0.0) as the source address. The DHCP server of the router 104 may then respond to this DHCP DISCOVER message by sending a DHCP OFFER message indicating its existence as a DHCP server. In response to the DHCP OFFER message, the node may then send a DHCP REQUEST message. And the DHCP server may then assign an IP address to the node and respond to the node with a DHCP ACK (acknowledgement) message specifying the assigned IP address and a designated lifetime for the IP-address assignment or "lease." Further, the router 104 may update its DHCP table accordingly, specifying the assigned IP address and corresponding MAC address of the node.

The DHCP OFFER message and/or the DHCP ACK message in this process may also specify certain configuration parameters for assignment to the node, such as (i) the IP address of the router 104 as a default-gateway address for the node and (ii) one or more DNS server addresses for use by the node.

Upon receipt of the DHCP OFFER message and/or the DHCP ACK message, the node may thus configure itself with the specified configuration parameters.

For instance, the node may configure itself to use the specified default-gateway address of the router 104 for the node's packet-data communications on the internet 116. This use of the router 104 as the node's default gateway may include the node transmitting outbound packets to the router 104, the router 104 applying network address translation (NAT) to map the node's IP address on the LAN to the router's public IP address, and the router 104 forwarding those outbound packets via the modem for transmission to their destinations on the internet 116. In addition, this use of the router 104 may also include the router 104 receiving from the internet inbound packets that are destined to the node, applying NAT to translate destination IP addresses of those packets to the local IP address of the node, and forwarding those packets on the LAN to the node.

Further, the node may configure itself to use the specified DNS address(es) for translating domain names to IP addresses so as to facilitate addressing outbound packets. Thus, per the configuration, when the node has a communication to send to a given domain on the internet 116, the node could send a DNS query to such a specified DNS address to translate the domain to a public IP address and could then transmit the communication to that public IP address.

As noted, each IP-address lease may have a designated lifetime value, which may be a finite duration such as a number of minutes, hours, or days. Normally at some point before expiration of that lifetime, the node may transmit to the DHCP server at the router 104 a DHCP renew request (e.g., a new DHCP REQUEST message), in response to which the DHCP server may transmit to the node a new DHCP ACK renewing the node's IP address lease and again specifying a lease lifetime. Alternatively, if the DHCP server is unwilling or unable to renew the lease, the DHCP server could send to the node a DHCP NAK (negative acknowledgement) message, in response to which the node may then restart the DORA process.

As noted above, with IPv4 by way of example, nodes may also use ARP to map IP addresses to MAC addresses. According to ARP, when a first node seeks to transmit data to a IP address of a second node, the first node may refer to its ARP cache to see if it already has a mapping that specifies the MAC address corresponding with that IP address. If not, the first node may broadcast an ARP REQUEST seeking to determine the MAC address. Upon broadcast of this ARP REQUEST, the second node, which has the IP address specified as being at issue would then respond by transmitting an ARP REPLY specifying the MAC address of the second node. Thus, the first node would receive in the ARP REPLY the MAC address that corresponds with the IP address of the second node, and the first node could then transmit the data to that MAC address.

With the LAN of FIG. 1 operating according to IPv4, normal processing as each of various nodes gets enabled on the LAN may be for each node to acquire an IP address dynamically assigned by the router 104, with the router 104 accordingly updating its DHCP and ARP tables to map the node's assigned IP address with the node's MAC address. Further, upon discovering presence of the router 104, each node may configure itself to use the router 104 as its default gateway as noted above and may also configure itself to use DNS servers as specified by the router 104.

In this or another arrangement, the streaming meter 110 could engage in a process to cause the one or more hosts 106 on the LAN to use the streaming meter 110 instead of the router 104 as their default gateway, so that traffic between each host 106 and the router 104 could flow through the streaming meter 110, and the streaming meter 110 could monitor that traffic and report accordingly to the media-measurement server platform 122 to facilitate media-exposure measurement.

To do this, the streaming meter 110 could carry out processing to help prevent the router 104 from assigning IP addresses and to undo existing router IP-address assignments, and the streaming meter 110 could itself implement a DHCP server to assign IP addresses and configure hosts to use the streaming meter 110 as their default gateway and possibly further as a DNS server. In this way, the streaming meter 110 could inject itself as an intermediary in the host's network traffic, to facilitate media-exposure measurement.

As the router 104 may still remain as a principal routing point in the LAN, a goal in this process may be to change the DHCP table at the router 104 so that each of the host's IP addresses in that DHCP table would get mapped to a respective MAC address of the streaming meter 110 rather than to a MAC address of the host. For instance, for each host 106, the streaming meter 110 could randomly (or otherwise) generate a respective artificial MAC address of the streaming meter and could work to populate the router's DHCP table to map an IP address of that host to that artificial MAC address of the streaming meter. Further, for each IP address that the router could assign but that is not currently assigned to a host on the LAN, the streaming meter 110 could likewise generate a respective artificial MAC address of the streaming meter and could also work to populate the router's DHCP table to map the IP address to that artificial MAC address of the streaming meter. Because the streaming meter 110 would treat these artificial MAC addresses as MAC addresses of the streaming meter, the streaming meter would be configured to monitor for and receive Ethernet frames destined to each such artificial MAC address.

To begin with, as to any IP addresses that the router 104 has already assigned, the streaming meter 110 could identify those assigned IP addresses and could cause the router 104 to release those assignments. To do this, the streaming meter 110 could broadcast an ARP REQUEST respectively for each potential IP address on the LAN, in order to identify each currently assigned IP address on the LAN. Further, for each identified IP address, the streaming meter 110 could transmit to the router 104 a DHCP RELEASE message, causing the router 104 to release the IP address assignment. (For each such identified IP address, the streaming meter 110 could delay sending this DHCP RELEASE message until a later time point when the host to which that IP address was assigned is no longer present on the LAN, in order to help circumvent any active protection that the router 104 may apply against spoofed DHCP RELEASE message.)

For each such released IP address and each other allocable IP address on the LAN, the streaming meter 110 could further cause the router 104 to assign the IP address to the streaming meter 110. Namely, for each IP address, the streaming meter 110 could send to the router 104 a DHCP REQUEST requesting assignment of that particular IP address (e.g., by including in the request a specification of that IP address) and specifying one of the streaming meter's artificial MAC addresses. The router 104 may then grant this IP address assignment, sending to the streaming meter a DHCP ACK message and accordingly updating the router's DHCP table and ARP table to map the IP address to the artificial MAC address of the streaming meter 110.

Note that, to expedite this process as to each of multiple IP addresses, the streaming meter 110 could skip transmitting a DHCP DISCOVER message to the router 104 and could thus also skip receiving a DHCP OFFER message from the router 104, rather proceeding directly to transmission of a DHCP REQUEST message to the router 104. (Further, another way to help expedite this process if the streaming meter 110 sends a DHCP DISCOVER message may be for the streaming meter 110 to use the "Rapid Commit" option in that DHCP DISCOVER message.)

By the streaming meter 110 thus acquiring assignment from the router 104 of each allocable IP address in the LAN, the router 104 would have no IP addresses available to assign and would therefore not respond (e.g., positively or at all) to DHCP DISCOVER messages or DHCP REQUEST messages from the hosts 106. The streaming meter 110 may thereby starve the router 104 of its allocable IP addresses.

With this process, hosts that had IP addresses assigned by the router 104 may be unaware of this change at the router 104 and may therefore continue to use their router-assigned IP addresses until they send DHCP renew requests for those IP addresses. As each host sends to the router 104 a DHCP renew request for the host's existing IP lease, however, the router 104 would reject that DHCP renew request, since the router 104 would have that IP address already assigned to the streaming meter 110. As a result, each such host may engage in the DORA process anew. But at this point, since the router 104 has no allocable IP addresses, the router 104 would not respond to DHCP DISCOVER messages as noted above. Instead, the streaming meter's DHCP server may respond to the hosts' DHCP DISCOVER messages and engage in further DORA signaling with each host to assign to each host a respective IP address, which could be the same IP address that the router 104 had assigned to the host.

Operating as a DHCP server for each host, the streaming meter 110 would maintain a DHCP table as described above. Further, the streaming meter 110 may maintain an ARP table and could update the ARP table when the streaming meter 110 makes changes to its DHCP table. Thus, when the streaming meter 110 assigns an IP address to a host, the streaming meter could update its DHCP table and its ARP table to map that IP address to the actual MAC address of that host.

As noted above, through its DHCP messaging to each host, the streaming meter 110 could set an IP address of the streaming meter 110 as the default gateway IP address for use by the host. Therefore, when the host sends outbound packets destined to addresses on the internet 116, the host would send those packets to the streaming meter 110, the streaming meter 110 would perform NAT and forward those packets on to the router 104, and the router 104 may view those packets as having been sent by the streaming meter 110. And when the router 104 receives from the internet 116 associated inbound packets, the router 104 would route those packets to the streaming meter 110, and the streaming meter 110 would in turn route those packet to the host.

Further, as noted above, through its DHCP messaging to each host, the streaming meter 110 could also set an IP address of the streaming meter 110 as a DNS server address for use by the host. Therefore, when the host then sends DNS queries, the host would send those DNS queries to the streaming meter 110, and the streaming meter 110 would forward the queries along to the router 104 for transmission on the internet 116 to an actual DNS server.

Example Configuration and Operation of Streaming Meter

As noted above, in order to help address potential internet outages resulting from the streaming meter 110 losing its ability to communicate on the LAN, the streaming meter 110 could be structured to include backup gateway logic.

Figure 2:
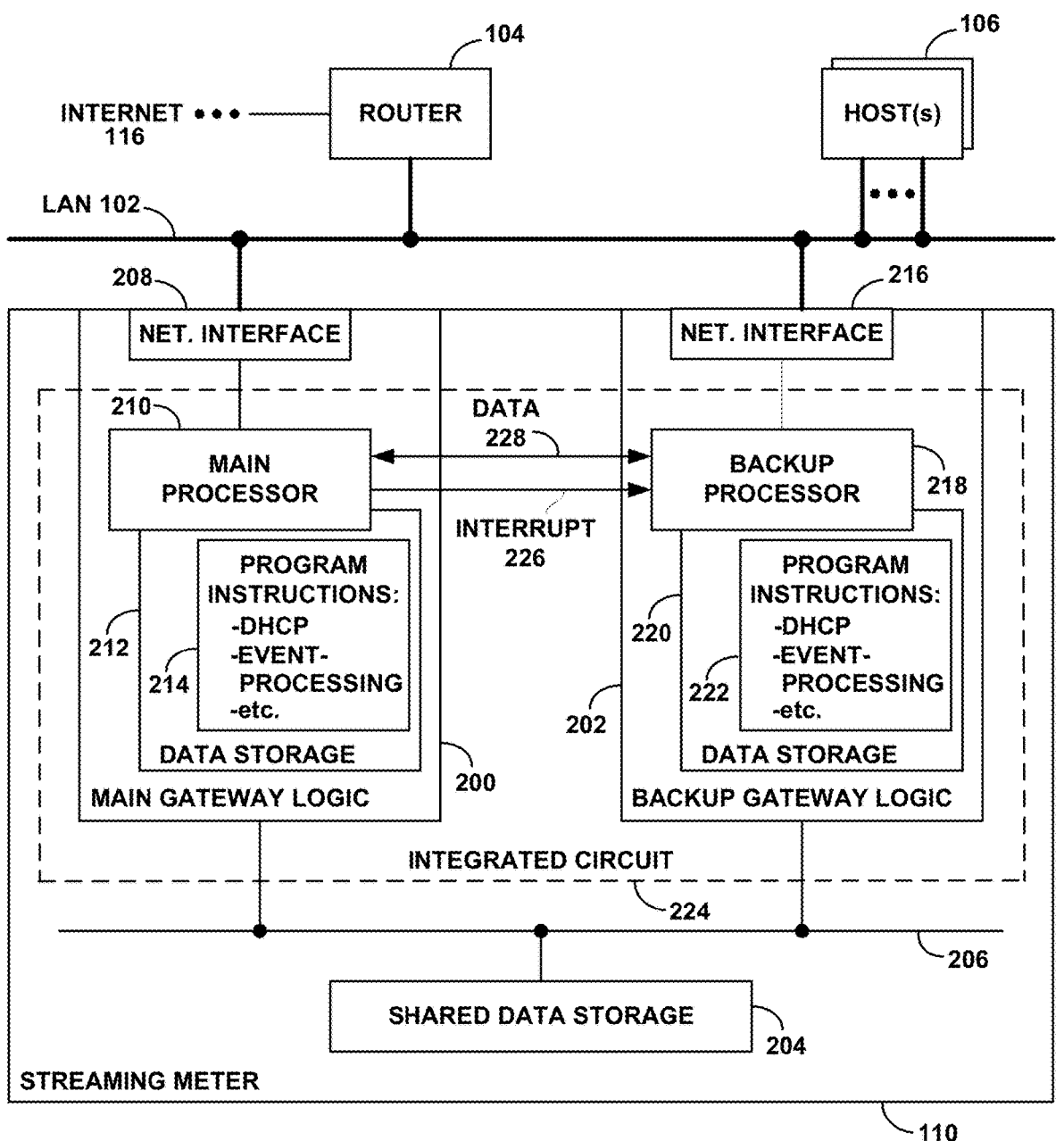
FIG. 2 is a simplified block diagram of a streaming meter as an example intermediary gateway or computing system that could carry out various disclosed operations.

FIG. 2 is a simplified block diagram illustrating the example of streaming meter 110 on the LAN 102. As shown in FIG. 2, the example streaming meter 110 includes main gateway logic 200, backup gateway logic 202, and shared data storage 204, all of which may be interconnected through a system bus or other connection mechanism 206. In line with the discussion above, this arrangement could also be generalized to be any intermediary gateway on a network, not necessarily limited to a streaming meter.

The main gateway logic 200 and backup gateway logic 202 could each comprise respective digital logic circuits and program logic, such that the main gateway logic 200 and backup gateway logic 202 could each separately cause the streaming meter to function as a default gateway for the one or more hosts 106, including possibly functioning as a DHCP server and a DNS server for the one or more hosts 106.

In the example arrangement shown, for instance, the main gateway logic 200 includes a main network interface 208 for physically connecting with the LAN 102, a main processor 210 for carrying out operations of the main gateway logic 200, and main-processor non-transitory data storage 212 suitable for holding main-processor program instructions 214 that could be executable by the main processor 210 to carry out those operations. Without limitation, the main network interface 208 could be an Ethernet interface, the main processor 210 could be a microprocessor or microcontroller (e.g., an A53 microprocessor), and the main-processor data storage 212 could be volatile and/or non-volatile memory (e.g., cache memory, random access memory (RAM), or flash memory), which may be integrated in whole or in part with the main processor 210.

The main-processor program instructions 214 of the main gateway logic 200 could comprise streaming-meter program instructions, such as an operating system (e.g., Linux OS) and possibly associated application logic, executable by the main processor 210 to carry out various streaming-meter operations.

This could include DHCP-stack logic executable by the main processor 210 to function as a DHCP client for managing assignment from the router 104 of IP addresses leases corresponding with the streaming meter's artificial MAC addresses, and to function as a DHCP server for managing assignment by the streaming meter 110 of IP address leases to the one or more hosts 106. This may also include router logic (e.g., NAT logic) for forwarding outbound communications from the one or more hosts 106 to the router 104 for output onto the internet, and for forwarding inbound internet communications from the router 104 to the appropriate destination hosts. Further, this may include logic executable by the main processor 210 to manage DNS queries from the one or more hosts 106, such as to forward those queries along to one or more actual DNS servers and to forward DNS replies back to the querying hosts. Yet further, this may include event-processing logic executable by the main processor 210 to monitor network traffic of the one or more hosts 106, to detecting relevant events (e.g., DNS queries, streaming media traffic, web browsing, etc.), and responsively report detected events to the media-measurement server platform 122 to facilitate media-exposure measurement.

Likewise, the backup gateway logic 202 in the example arrangement includes a backup network interface 216 for physically connecting with the LAN 102, a backup processor 218 for carrying out operations of the backup gateway logic 202, and backup-processor non-transitory data storage 220 suitable for holding backup-processor program instructions 222 that could be executable by the backup processor 218 to carry out those operations. Without limitation, the backup network interface 216 could be a separate Ethernet interface (or could alternatively be the same physical interface as the main network interface 208), the backup processor 218 could be a separate microprocessor or microcontroller (e.g., an M7 microcontroller), and the backup-processor data storage 220 could be separate volatile and/or non-volatile memory (e.g., cache memory, RAM, or flash memory), which could similarly be integrated in whole or in part with the backup processor 218.

The backup-processor program instructions 222 of the backup gateway logic 202 could similarly comprise streaming-meter program instructions, such as an operating system (e.g., Real-time Operating System (RTOS)) and possibly associated application logic, executable by the backup processor 218 to carry out the various streaming-meter operations noted above. In some implementations, this may include the event-processing logic noted above. Whereas, in other implementations, this may include little or no event-processing logic, possibly leaving that functionality for the main processor 210 to handle when possible.

In both the main gateway logic 200 and the backup gateway logic 202, the streaming meter 110 may implement safeguards to protect user privacy. In addition to panelists opting in as noted above, for instance, the streaming meter 110 may process just metadata (e.g., packet headers, DNS queries, etc.) rather than tracking content consumption and other activity. Further, the streaming meter may encrypt data both for transmission and storage. And the streaming meter may scramble private data.

The shared data storage 204 may be persistent data storage such as eMMC flash storage and/or eEPROM data storage, which could hold shared data for use by both the main processor 210 and the backup processor 218 to facilitate carrying out the streaming-meter operations.

This shared data could include the program instructions noted above, including the main-processor program instructions 214, which the main processor 210 may load into its main-processor data storage 212 when the main processor 210 boots up, and the backup-processor program instructions 222, which the backup processor 218 may load into its backup-processor data storage 220 when the backup processor 218 boots up.

Further, this shared data could include various streaming-meter operational data to facilitate operation of the streaming meter 110. This streaming-meter operational data could include, by way of example, (i) DHCP client data that maps IP addresses assigned by the router 104 to artificial MAC addresses of the streaming meter 110, (ii) DHCP server data that maps host IP addresses assigned by the streaming meter 110 to MAC addresses of the hosts, (iii) NAT state data for current NAT transactions being processed by the streaming meter 110 to facilitate routing between the router 104 and the one or more hosts 106, (iv) DNS state data for current DNS-query transactions currently being processed by the streaming meter 110, and (v) event-processing data such as information about the state of monitoring network traffic and of detecting events for reporting to the media-measurement server platform 122 to facilitate media-exposure measurement.

In some implementations, the main processor 210 and backup processor 218 may each have direct access to this shared data storage 204, with an ability to write to the data storage 204 and read from the data storage 204. In other implementations, just the backup processor 218 may have direct access to the shared data storage 204, and the main processor 210 may effectively read from and write to the shared data storage 204 through communication with the backup processor 218. Other arrangements are possible as well.

In some implementations, the main processor 210 (e.g., with the main-processor data storage 212) and the backup processor 218 (e.g., with the backup-processor data storage 220) may be provided on a common integrated circuit (IC) within the streaming meter 110. In other implementations, the main processor 210 (e.g., with the main-processor data storage 212) and the backup processor 218 (e.g., with the backup-processor data storage 220) may be provided on separate ICs within the streaming meter 110.

With these or other implementations, IC pins could provide the processors with connections to other components of the streaming meter 110. For instance, IC pins could provide connectivity (i) between the main processor 210 and the main network interface 208, (ii) between the main processor 210 and the shared data storage 204, (iii) between the backup processor 218 and the backup network interface 216, and (iv) between the backup processor 218 and the shared data storage 204.

The streaming meter 110 could also include one or more interfaces between the main processor 210 and the backup processor 218, to help facilitate various operations. These interfaces may take various forms, such as Serial Peripheral Interface (SPI), Secure Digital Input Output (SDIO), Universal Serial Bus (USB), Peripheral Component Interface (PCI), or Direct Memory Access (DMA) interfaces, possibly through IC pins if the processors are provided on separate ICs for instance. As shown in FIG. 2, at least one such interface between the processors could be an interrupt interface 226, which could carry heartbeat interrupt signals from the main processor 210 to the backup processor 218 in order to let the backup processor know that the main processor 210 is active. And at least another such interface between the processors could be a data interface 228 through which the processors could exchange networking data as noted above.

Within the streaming meter 110, either one of the main gateway logic 200 and backup gateway logic 202 may be active at a time (with some exceptions), enabling the streaming meter 110 to function as a default gateway for each of the one or more hosts, including operating a DHCP stack as noted above and operating as a DNS server for the hosts, and enabling the streaming meter 110 to engage in traffic monitoring to facilitate media-exposure measurement.

As a general matter, the main gateway logic 200 would be active, with the main processor 210 carrying out these functions, and the backup gateway logic 202 would be inactive, with the backup processor 218 generally being in a low power sleep or idle state. When the main gateway logic 200 loses its ability to communicate on the LAN, however, the backup gateway logic 202 may become active and then carry out these functions in place of the main gateway logic 200.

To facilitate this switchover process, the main processor 210 could regularly transmit heartbeat interrupt signals over interface 226 to the backup processor 218, possibly at a rate of around one heartbeat every 100 ms. Further, the main processor 210 could apply a software or hardware watchdog timer keyed to the main processor's ability to communicate on the LAN, and expiration of the watchdog timer could cause the main processor 210 to reboot, during which time the main processor 210 would no longer be sending heartbeat signals to the backup processor 218.

The main processor 210 could further regularly monitor to determine whether the main processor 210 is able to communicate on the LAN, so that the main processor 210 can detect when the main processor 210 loses the ability to communicate on the LAN. This monitoring can take various forms, including possibly software processing and/or physical circuitry monitoring. By way of example, the main processor 210 could monitor whether there is any data flow between the main processor 210 and the main network interface 208 and could detect a loss of ability to communicate on the LAN by detecting an absence of such data flow. For instance, the main processor 210 could monitor whether an operating-system kernel of the main processor 210 receives input indicating presence of data input from the main network interface 208 and could detect a loss of ability to communicate on the LAN by detecting an absence of such input.

As long as the main processor 210 thereby concludes that it can communicate on the LAN, the main processor 210 may reset its watchdog timer before expiration of the watchdog timer. However, if and when the main processor 210 detects that the main processor 210 has lost the ability to communicate on the LAN, the main processor 210 may let its watchdog timer expire, which would result in a stop of heartbeat signals to the backup processor 218 as noted above.

The backup processor 218 may correspondingly monitor for its receipt of the heartbeat signals from the main processor 210. And when the backup processor 218 detects that it stops receiving the heartbeat signals from the main processor 210, the backup processor 218 may activate the backup gateway logic 202 to allow the streaming meter 110 to continue to function while the main gateway logic 200 is out of service. The backup gateway logic 202 may then continue to function in place of the main gateway logic 200 until the main processor has booted back up, at which point the main processor may restart sending heartbeat signals to the backup processor 218, in response to which the backup processor 218 may go back to its sleep state and the main gateway logic 200 may resume as the active gateway logic of the streaming meter 110.

In an example implementation, while the main gateway logic 200 is active, the main processor 210 may perform streaming-meter operations such as those noted above. For instance, the main processor 210 may execute (i) DHCP logic as noted above for functioning as a DHCP client and a DHCP server, (ii) router logic as noted above for forwarding communications between the hosts 106 and the router 104, (iii) DNS logic as noted above for managing DNS queries from the one or more hosts 106, and (iv) event-processing logic as noted above for monitoring network traffic to detect media-measurement-related events and reporting accordingly to the media-measurement server platform 122.

As the main processor 210 carries out these and/or other streaming-meter operations, the main processor 210 may maintain in the main-processor data storage 212 the streaming-meter operational data noted above. Further, the main processor 210 may also keep a copy of this data in the shared data storage 204. And as the main processor 210 updates this streaming-meter operational data, the main processor 210 may update the copy in the shared data storage 204.

Meanwhile, each time the backup processor 218 receives from the main processor 210 a heartbeat interrupt signal, the backup processor may wake temporarily from its low power state and may read the shared data storage 204 and load into the backup-processor data storage 220 a latest copy of the shared data, perhaps just any incremental changes to the shared data since a last load of the data. This way, if and when the backup gateway logic 202 takes over as the active gateway logic of the streaming meter 110, the backup processor 218 would have ready access to that data.

When the backup gateway logic 202 is active in place of the main gateway logic 200, the backup processor 218 may perform streaming-meter operations such as those noted above. For instance, the backup processor 218 may execute (i) DHCP logic as noted above for functioning as a DHCP client and a DHCP server, (ii) router logic as noted above for forwarding communications between the hosts 106 and the router 104, and (iii) DNS logic as noted above for managing DNS queries from the one or more hosts 106. Further, the backup processor 218 may also execute event-processing logic as noted above for monitoring network traffic to detect media-measurement-related events and reporting accordingly to the media-measurement server platform 122. Alternatively, the backup processor 218 may carry out just part of this event processing, such as detecting and recording events for later reporting by the main gateway logic 200, or the backup processor 218 may not carry out any event-processing.

As the backup processor 218 carries out these and/or other streaming-meter operations, the backup processor 210 may maintain in the backup-processor data storage 220 the streaming-meter operational data noted above. Further, the backup processor 218 may also keep a copy of this data in the shared data storage 204. And as the backup processor 210 updates this streaming-meter operational data, the backup processor 218 may update the copy in the shared data storage 204.

Once the main processor 210 has rebooted, the main processor 210 may then retrieve from the shared data storage 204 a latest copy of the streaming-meter operational data, so that the main gateway logic 200 may then resume operation as the active gateway logic of the streaming meter 110.

FIG. 3 is next a flow chart illustrating a method that could be carried out in accordance with the present disclosure to facilitate internal failover of an intermediary gateway, namely a device on a network that operates as an intermediary between a router and one or more hosts on the network. The intermediary gateway may be a streaming meter but may also take other forms.

As shown in FIG. 3, at block 300, the method includes the intermediary gateway operating in a default mode in which main gateway logic in the intermediary gateway governs operation of the intermediary gateway, the main gateway logic including a main processor. Further, at block 302, the method includes, while the intermediary gateway is operating in the default mode, the intermediary gateway detecting a failure of the main gateway logic to communicate on the network. At block 304, the method then includes, responsive to detecting the failure of the main gateway logic to communicate on the network, the intermediary gateway transitioning from the default mode to a backup mode in which backup gateway logic in the intermediary gateway governs the operation of the intermediary gateway, the backup gateway logic including a backup processor separate from the main processor.

In line with the discussion above, the intermediary gateway could be a streaming meter (e.g., with the network being at a media-measurement panelist's site), in which case operation of the intermediary gateway could include streaming-meter operations. For instance, as discussed above, this could include (i) DHCP operations as a DHCP client served by a router on the network and as a DHCP server serving one or more hosts on the network, (ii) router operations for forwarding network communications between each of the one or more hosts and the router, and/or (iii) DNS operations for managing DNS queries from the one or more hosts. Further, this could include event-processing operations for monitoring network traffic of the one or more hosts to detect media-measurement events and to report accordingly to a media-measurement platform to facilitate media-exposure measurement.

Further, as discussed above, in the default mode, the main processor could communicate on the network through a main network interface in the intermediary gateway, and in the backup mode, the backup processor could communicate on the network through a backup network interface in the intermediary gateway.

In addition, as discussed above, the act of the intermediary gateway transitioning to the backup mode could involve the main processor discontinuing sending of heartbeat interrupt signals to the backup processor, and the backup processor activating the backup gateway logic responsive to the discontinuing of the heartbeat interrupt signals.

Further, as discussed above, the intermediary gateway could maintain in shared data storage in the intermediary gateway various operational data useable by both the main gateway logic and backup gateway logic to govern operation of the intermediary gateway. And still further, in the default mode, the main processor could transmit to the backup processor heartbeat interrupt signals, and the backup processor could obtain updated operational data from the shared data storage in response to receipt by the backup processor of each heartbeat interrupt signal. As noted above, this obtaining of the updated operational data could enable the backup gateway logic to readily take over for the main gateway logic upon detecting discontinuing of the heartbeat interrupt signals from the main processor.

As further discussed above, an intermediary gateway as presently contemplated could thus comprise main gateway logic and backup gateway logic. The main gateway logic could include a main network interface, a main processor, and main-processor non-transitory data storage, with the main-processor non-transitory data storage holding main program instructions executable by the main processor to govern operations of the intermediary gateway. And the backup gateway logic could include a backup network interface, a backup processor, and backup non-transitory data storage, and the backup-processor non-transitory data storage holding backup program instructions executable by the backup processor to govern the operations of the intermediary gateway. As noted above, the main program instructions could be executable by the main processor to detect a failure of the main processor to communicate on the network and to responsively cause the backup processor to activate the backup gateway logic as active gateway logic of the intermediary gateway. Or phrased another way, the main program instructions could be executable by the main processor to detect a failure of the main processor to communicate on the network and to responsively cause activation of the backup gateway logic as active gateway logic of the streaming meter.

In line with the discussion above the intermediary gateway could be a streaming meter, and the operation of the intermediary gateway could thus involve streaming-meter operations such as those noted above.

Further, as discussed above the act of causing the backup processor to activate the backup gateway logic as the active gateway logic of the intermediary gateway could involve discontinuing transmission of heartbeat signals from the main processor to the backup processor. And the backup program instructions could be executable by the backup processor to detect the discontinuing of transmission of the heartbeat signals and, responsive to detecting the discontinuing of transmission of the heartbeat signals, to activate the backup gateway logic as the active gateway logic of the intermediary gateway.

In addition, as discussed above, the intermediary gateway could also include shared non-transitory data storage holding operational data useable by both the main gateway logic and backup gateway logic to govern operation of the intermediary gateway. Further, the main program instructions could be executable by the main processor to cause the main processor to send heartbeat interrupt signals to the backup processor, and the backup program instructions could be executable by the backup processor to cause the backup processor to obtain updated operational data from the shared non-transitory data storage in response to receipt by the backup processor of each heartbeat interrupt signal, with the obtaining of the updated operational data enabling the backup gateway logic to readily take over for the main gateway logic upon detecting discontinuing of the heartbeat interrupt signals from the main processor.

Still further, as noted above the main processor and backup processor could be disposed on a common IC within the intermediary gateway or could be disposed on separate ICs within the intermediary gateway.

The present disclosure also contemplates non-transitory data storage (e.g., one or more storage components, such as flash, optical, magnetic, ROM, RAM, EPROM, EEPROM, etc.) having stored thereon program instructions executable by processors of an intermediary gateway, such as but not limited to a streaming meter, to cause the intermediary gateway to carry out various operations disclosed herein when the intermediary gateway is enabled on a LAN, including for instance the operations described with respect to FIG. 3.

Exemplary embodiments have been described above. Those skilled in the art will understand, however, that changes and modifications may be made to these embodiments without departing from the true scope and spirit of the invention.

What is claimed is:

1. A streaming meter operable on a network, the streaming meter comprising:

main gateway logic, including a main network interface, a main processor, and main-processor non-transitory data storage, wherein the main-processor non-transitory data storage holds main program instructions executable by the main processor to govern streaming-meter operations of the streaming meter; and backup gateway logic, including a backup network interface, a backup processor, and backup non-transitory data storage, wherein the backup-processor non-transitory data storage holds backup program instructions executable by the backup processor to govern the streaming-meter operations of the streaming meter, wherein the main program instructions are executable by the main processor to detect a failure of the main processor to communicate on the network and to responsively cause activation of the backup gateway logic as active gateway logic of the streaming meter.

2. The streaming meter of claim 1, wherein the streaming-meter operations comprise at least one operation selected from the group consisting of (i) Dynamic Host Control Protocol (DHCP) operations as a DHCP client served by a router on the network and as a DHCP server serving one or more hosts on the network, (ii) router operations for forwarding network communications between each of the one or more hosts and the router, (iii) Domain Name Service (DNS) operations for managing DNS queries from the one or more hosts, and (iv) event-processing operations for monitoring network traffic of the one or more hosts to detect media-measurement events and to report accordingly to a media-measurement platform to facilitate media-exposure measurement.

3. The streaming meter of claim 1, wherein the main processor and backup processor are disposed on a common integrated circuit within the streaming meter.

4. An intermediary gateway operable on a network, the intermediary gateway comprising:

main gateway logic, including a main network interface, a main processor, and main-processor non-transitory data storage, wherein the main-processor non-transitory data storage holds main program instructions executable by the main processor to govern operations of the intermediary gateway; and backup gateway logic, including a backup network interface, a backup processor, and backup non-transitory data storage, wherein the backup-processor non-transitory data storage holds backup program instructions executable by the backup processor to govern the operations of the intermediary gateway, wherein the main program instructions are executable by the main processor to detect a failure of the main processor to communicate on the network and to responsively cause the backup processor to activate the backup gateway logic as active gateway logic of the intermediary gateway.

5. The intermediary gateway of claim 4, wherein the intermediary gateway is a streaming meter, and wherein the operation of the intermediary gateway comprise streaming-meter operations.

6. The intermediary gateway of claim 5, wherein the streaming-meter operations comprise at least one operation selected from the group consisting of (i) Dynamic Host Control Protocol (DHCP) operations as a DHCP client served by a router on the network and as a DHCP server serving one or more hosts on the network, (ii) router operations for forwarding network communications between each of the one or more hosts and the router, and (iii) Domain Name Service (DNS) operations for managing DNS queries from the one or more hosts.

7. The intermediary gateway of claim 5, wherein the streaming-meter operations comprise at least one operation selected from the group consisting of (i) Dynamic Host Control Protocol (DHCP) operations as a DHCP client served by a router on the network and as a DHCP server serving one or more hosts on the network, (ii) router operations for forwarding network communications between each of the one or more hosts and the router, (iii) Domain Name Service (DNS) operations for managing DNS queries from the one or more hosts, and (iv) event-processing operations for monitoring network traffic of the one or more hosts to detect media-measurement events and to report accordingly to a media-measurement platform to facilitate media-exposure measurement.

8. The intermediary gateway of claim 4, wherein causing the backup processor to activate the backup gateway logic as the active gateway logic of the intermediary gateway comprises discontinuing transmission of heartbeat signals from the main processor to the backup processor, wherein the backup program instructions are executable by the backup processor to detect the discontinuing of transmission of the heartbeat signals and, responsive to detecting the discontinuing of transmission of the heartbeat signals, to activate the backup gateway logic as the active gateway logic of the intermediary gateway.

9. The intermediary gateway of claim 4, further comprising shared non-transitory data storage holding operational data useable by both the main gateway logic and backup gateway logic to govern operation of the intermediary gateway.

10. The intermediary gateway of claim 9, wherein the main program instructions are executable by the main processor to cause the main processor to send heartbeat interrupt signals to the backup processor, and wherein the backup program instructions are executable by the backup processor to cause the backup processor to obtain updated operational data from the shared non-transitory data storage in response to receipt by the backup processor of each heartbeat interrupt signal, wherein obtaining the updated operational data enables the backup gateway logic to readily take over for the main gateway logic upon detecting discontinuing of the heartbeat interrupt signals from the main processor.

11. The intermediary gateway of claim 4, wherein the main processor and backup processor are disposed on a common integrated circuit within the intermediary gateway.

12. A method for internal failover of an intermediary gateway on a network, the method comprising:

operating, by the intermediary gateway, in a default mode in which main gateway logic in the intermediary gateway governs operation of the intermediary gateway, wherein the main gateway logic includes a main processor;

while operating by the intermediary gateway in the default mode, detecting by the intermediary gateway a failure of the main gateway logic to communicate on the network;

responsive to detecting the failure of the main gateway logic to communicate on the network, transitioning by the intermediary gateway from the default mode to a backup mode in which backup gateway logic in the intermediary gateway governs the operation of the intermediary gateway, wherein the backup gateway logic includes a backup processor separate from the main processor, wherein transitioning by the intermediary gateway to the backup mode comprises discontinuing by the main processor sending of heartbeat interrupt signals to the backup processor, and activating by the backup processor the backup gateway logic responsive to the discontinuing of the heartbeat interrupt signals.

13. The method of claim 12, wherein the intermediary gateway is a streaming meter, and wherein the operation of the intermediary gateway comprises streaming-meter operations.

14. The method of claim 13, wherein the streaming-meter operations comprise at least one operation selected from the group consisting of (i) Dynamic Host Control Protocol (DHCP) operations as a DHCP client served by a router on the network and as a DHCP server serving one or more hosts on the network, (ii) router operations for forwarding network communications between each of the one or more hosts and the router, and (iii) Domain Name Service (DNS) operations for managing DNS queries from the one or more hosts.

15. The method of claim 13, wherein the streaming-meter operations comprise at least one operation selected from the group consisting of (i) Dynamic Host Control Protocol (DHCP) operations as a DHCP client served by a router on the network and as a DHCP server serving one or more hosts on the network, (ii) router operations for forwarding network communications between each of the one or more hosts and the router, (iii) Domain Name Service (DNS) operations for managing DNS queries from the one or more hosts, and (iv) event-processing operations for monitoring network traffic of the one or more hosts to detect media-measurement events and to report accordingly to a media-measurement platform to facilitate media-exposure measurement.

16. The method of claim 13, wherein the network is at a media-measurement panelist's site.

17. The method of claim 12, wherein, in the default mode, the main processor communicates on the network through a main network interface in the intermediary gateway, and in the backup mode, the backup processor communicates on the network through a backup network interface in the intermediary gateway.

18. The method of claim 12, further comprising maintaining by the intermediary gateway, in shared data storage in the intermediary gateway, operational data useable by both the main gateway logic and backup gateway logic to govern operation of the intermediary gateway.

19. The method of claim 18, further comprising, in the default mode, transmitting by the main processor to the backup processor heartbeat interrupt signals, and obtaining by the backup processor updated operational data from the shared data storage in response to receipt by the backup processor of each heartbeat interrupt signal, wherein obtaining the updated operational data enables the backup gateway logic to readily take over for the main gateway logic upon detecting discontinuing of the heartbeat interrupt signals from the main processor.

* * * * *